United States Patent Office 3,621,523
Patented Nov. 23, 1971

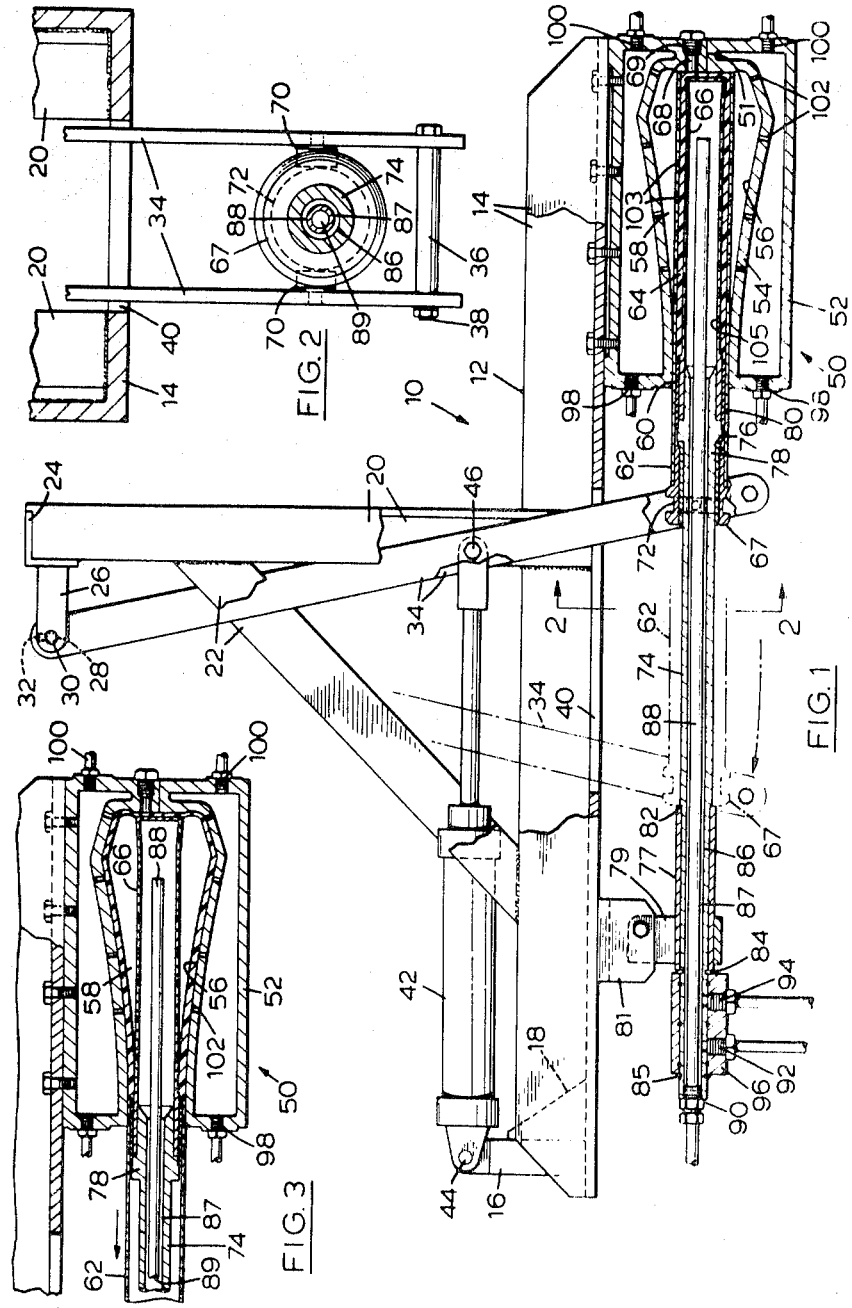

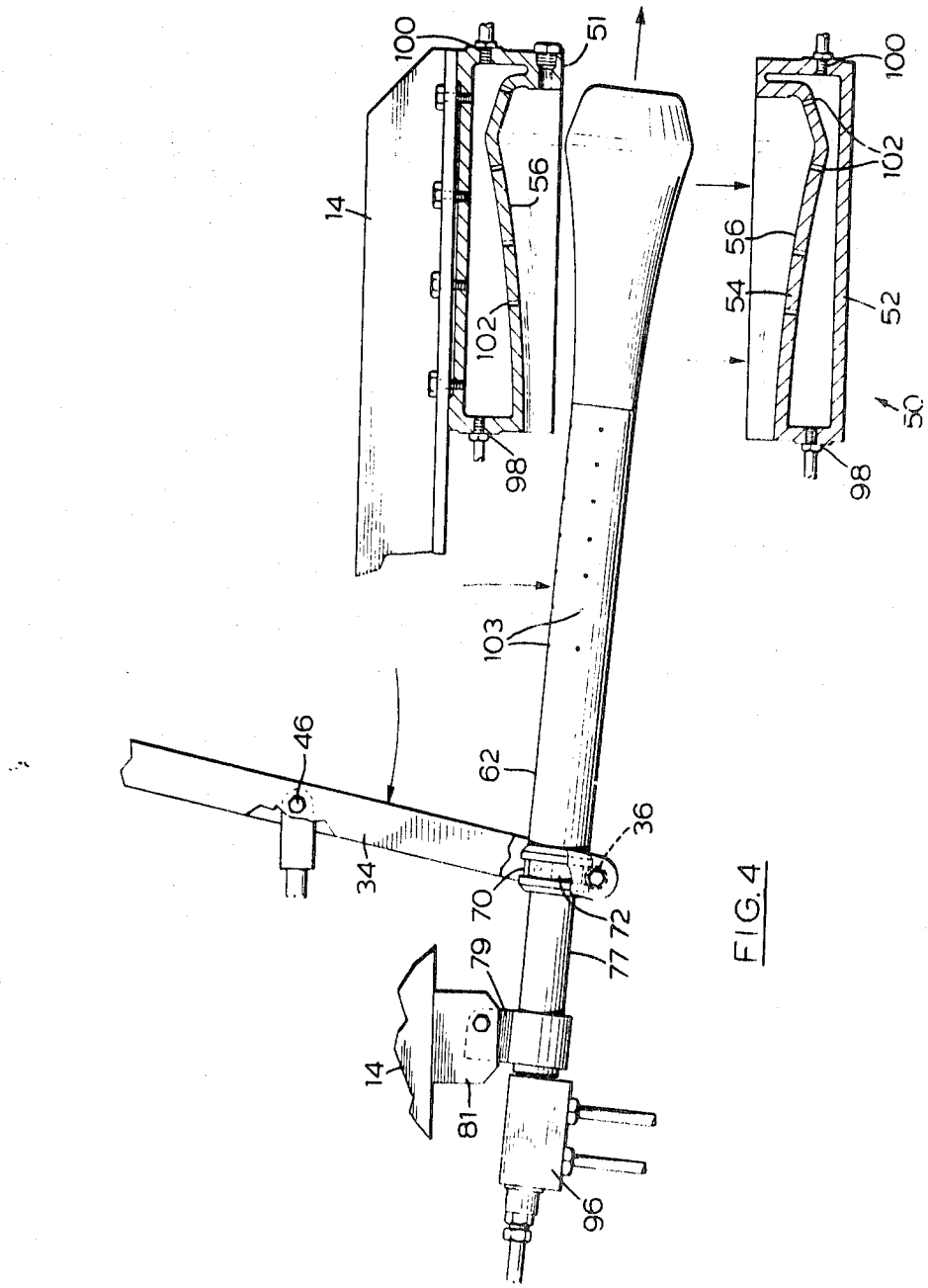

3,621,523
APPARATUS FOR MOLDING PLASTIC ARTICLES
Peter D. J. Dicks, Kitchener, Ontario, William M. Hill, Ayr, Ontario, and James T. Horn, Port Credit, Ontario, Canada, assignors to Cecil Harold Royce Day, Grimsby, Ontario, Canada
Original application Nov. 16, 1967, Ser. No. 683,656, now Patent No. 3,478,781. Divided and this application Jan. 30, 1969, Ser. No. 795,322
Int. Cl. B29c 5/06
U.S. Cl. 18—5 BJ
7 Claims

ABSTRACT OF THE DISCLOSURE

The present invention relates to an apparatus for the manufacture of plastic articles such as bottles from a foamable plastic material such as expandable polystyrene. The apparatus of the present disclosure includes a mould which has a first moulding chamber surrounded by a second moulding chamber and separated therefrom by a movable wall. The movable wall is adapted to be removed from the mould to permit the parison formed within the first mould to be expanded to the contour of the second mould. In the method of operation of the apparatus, the first moulding chamber is charged with a foamable plastic and the foamable plastic is expanded therein to form a tubular parison. After the expansion of the plastic material within the first mould has been substantially completed the movable outer wall of the first mould is withdrawn and the parison is further expanded by blow-moulding to the contour of the second mould. After the blow-moulding has been completed, the mould is split and the moulded article removed.

CROSS-REFERENCE TO RELATED APPLICATION

This application is a division of application Ser. No. 683,656, Method and Apparatus for Moulding Plastic Articles, filed Nov. 16, 1967, now Pat. No. 3,478,781.

BACKGROUND OF THE INVENTION

This invention relates to an apparatus for the manufacture of plastic containers. In particular, this invention relates to an apparatus for manufacturing expanded foam plastic containers such as bottles and the like.

Containers made from expanded foam plastic such as polystyrene foam are popular due to the fact that they are light in weight, inexpensive to manufacture and have desirable thermo-insulating properties. Expanded foam plastic containers such as polystyrene bottles have been manufactured by the well known blow-moulding methods. In the known method, the foam is extruded from a plastic extruder to form a tubular parison and the parison is clamped within a blow-moulding mould in such a way that the top and bottom of the tube is sealed and then air is introduced to the interior of the tube to blow the parison to the shape of the blow-moulding die. In the conventional method of extruding expandible polystyrene, all of the expansion or foaming takes place as the material leaves the extruder die. The expansion causes a drastic lowering in the temperature of the material with the result that a great deal of difficulty is experienced when trying to seal the bottom of a parison when it is clamped within a blow-moulding die. The lower temperature of the material causes frequent cracking to occur during the blow-moulding operation and in addition considerable stresses are set up within the moulded container and when hot liquid is introduced into the container in use failure of the container can frequently occur as a result of these high internal stresses. The extrusion of expanded foam plastic such as polystyrene foam is extremely difficult and complex and the expansion of the extruded material as it leaves the extrusion die is such that it is extremely difficult to control the parison as it enters the blow-molding die.

SUMMARY OF THE INVENTION

The present invention overcomes the difficulties of the prior art discussed above by providing a method of forming a plastic container from expanded foam plastic which comprises the steps of forming a fully expanded hollow tubular parison with a closed end in a first moulding chamber which is enclosed by a second moulding surface and separated therefrom by a movable wall, withdrawing the movable wall from the mould and further forming the substantially fully foam expanded tubular parison to the contour of the second moulding surface by blow-moulding.

The present invention also provides an apparatus for moulding foamable plastic material to form containers which comprise a first moulding means having a first mould chamber adapted to form a hollow tubular parison or member. The first moulding means comprises an inner tubular wall and an outer tubular wall. The first moulding means is enclosed within a second moulding surface to define a second moulding chamber between the second moulding surface and the outer tubular wall. Passage means is formed in the inner tubular wall, outer tubular wall and second moulding surface through which steam may pass into said first mould chamber. The outer wall of said first moulding means is adapted to be withdrawn from the second moulding chamber after a tubular parison has been formed within the first moulding means to permit the tubular parison to be blow-moulded to the contour of the second mould surface. Additional passage means opens into the first moulding chamber to permit the chamber to be charged with a predetermined quantity of a foamable plastic material and vent means is provided for venting the first and second chambers to permit steam to enter the first moulding means and to permit air to enter the second moulding means to permit blow-moulding.

It is, therefore, an object of this invention to provide an improved method of manufacturing expanded foam plastic containers.

It is a further object of this invention to provide an improved method of manufacturing containers wherein two moulding processes are carried out within the confines of one mould.

The present invention will be more clearly understood after reference to the detailed specification read in conjunction with the drawings, wherein:

FIG. 1 is a partially sectioned view of the moulding apparatus according to an embodiment of the present invention.

FIG. 2 is a sectional view taken along the line 2—2 of FIG. 1.

FIG. 3 is a sectional view of the mould of FIG. 1 in a blow-moulding position, and FIG. 4 is a partially sectioned side view of the moulding apparatus in an open position.

With reference to FIG. 1 of the drawings, it will be seen that the numeral 10 refers generally to a moulding apparatus according to an embodiment of the present invention. The structure of the apparatus is substantially symmetrical about the section shown in FIG. 1 of the drawings and this symmetry should be noted in the consideration of the following description of the apparatus illustrated in FIG. 1.

A frame 12 consists of a U-shaped channel 14 having an anchor plate 16 rigidly welded at one end thereof. The anchor plate 16 is provided with a pair of reinforcing struts 18, only one of which is shown in the section illustrated in FIG. 1. Vertically extending support members 20 are rigidly secured at their lower ends to the upstanding arms of the U-shaped channel member 14.

Each of the upstanding support members 20 is braced and rigidly supported in the vertical position by means of struts 22. The upper ends of the upstanding supports 20 are bridged by means of a bridge member 24. The support pillars 20, struts 22 and bridge member 24 are preferably made from angle iron sections rigidly welded together, as illustrated in FIG. 1. A fulcrum arm 26 is welded to the center of the bridge member 24 and extends substantially horizontally outwardly therefrom. A pivot pin 30 is rigidly retained by locking grip screw 32 within the opening 28 which is formed in the arm 26. The pivot pin 32 forms a fulcrum about which a pair of spaced lever arms 34 are adapted to pivot. As shown in FIG. 2 of the drawings, the arms 34 are maintained in a spaced parallel relationship by means of spacing washers 36 and clamping bolts 38 which extend between the two arms. The spacing washers 36 maintain the arms in a spaced relationship while the clamping bolts 38 maintain the rigidity of the relationship. The arms 34 extend through an elongated opening 40 formed in the base of the U-shaped channel 14. Pivoting movement of the arms 34 is caused by the action of the double acting hydraulic cylinder 42 one end of which is pivotably connected to the plate 16 by means of pivot pin 42 and the other end of which is pivotably connected to the pivot pin 46 which extends between and is rigidly connected to the arms 34.

When the hydraulic cylinder 42 is actuated, the arm 34 will pivot about the pivot pin 32.

The reference numeral 50 refers generally to the mould in which the containers are formed. The mould is formed in two halves which are clamped together along abutting horizontal surfaces 51 by quick release clamping bolts (not shown). Both halves of the mould consist of an outer casing 52 which is intergrally formed with an inner blow-moulding mould 54. The blow-mould 54 has an inner moulding surface 56 which has the contour of the finished article to be produced in the moulding operation. The inner moulding surface 56 defines the limits of the blow-moulding chamber. One end of the mould is formed with an opening 60 which is adapted to slidably receive a tubular outer wall member 62 in a close fitting sliding relationship. The bore of the outer tubular wall member 62 has a highly polished surface, preferably chromium plated, to permit easy withdrawal of the tube during the moulding operation, as will be described hereinafter. A pressure moulding chamber 64 is formed within the blow-moulding chamber 58 and is defined by the outer wall 62 and the inner wall 66. The outer wall 62 and the inner wall 66 are formed with passageways 103 and 105 respectively which permit steam and/or air to pass therethrough. The inner open end of the outer wall 62 contacts one end surface of the moulding surface 56 while the inner closed end of the inner wall 66 is spaced from the mould surface 56 to form a pressure moulding chamber adapted to mould a hollow tubular parison having a closed end. Access to the pressure moulding chamber 64 is by way of passageway 68 which has a removable closure plug 69. The pressure moulding chamber 64 forms the first moulding chamber and the blow-moulding chamber 54 forms the second moulding chamber in the sequence of operations of the apparatus.

One end of the outer wall 62 is rigidly connected to the reciprocating slide member 68 which is in turn connected to the lower end of the arm 34 by means of a pair of pivotably mounted pads 70 which co-operate with the groove 72 which is formed in the slide member 68.

One end of the guide rod 74 extends into the interior of the outer tubular wall 62 and into the opening 60 formed in the blow-mould chamber. The guide rod 74 is provided with a shoulder 76 which reacts against one end of the slide member 68 to limit the movement of the slide member. The end 78 of the guide rod 74 is rigidly secured to the inner tubular wall 66 and maintains the tubular wall in a fixed position relative to the blow-moulding chamber. A bearing spacer 80 is provided between the outer wall and the end 78 of the guide rod to facilitate the sliding movement of the outer wall relative to the rigidly mounted guide rod 74.

The other end of the guide rod 74 is secured by means of a sleeve 77 which is supported by an arm 79 which is in turn pivotably mounted on a bracket 80 which is secured to the channel 14 of the frame 12. The sleeve 76 abuts against a shoulder 82 formed on the guide rail 74 to prevent movement of the guide rail in one direction and a circlip 84 surrounds the guide rail 74 at the other end of the sleeve 76 to prevent movement of the guide rail in the other direction. The guide rail 74 has a bore 86 and a tube 88 extends through the bore 86 in a spaced parallel relationship thereto. The tube 88 is secured within the bore of the guide rail 74 by means of a standard connection 90. A pair of venting ports 92 and 94 are formed in a coupling block 96 and open into the annular space 87 which is formed within the guide rail 74. The coupling member 96 is located on the shaft 74 between the circlip 84 and a circlip 85. The tube 88 has a hollow bore 89 and extends into the space formed within the inner wall 66 and is spaced from the end of the mould.

The mould housing 52 is formed with steam or cooling ports 98 and 100. The ports 98 and 100 are connected to a suitable source of high pressure steam or a source of cooling fluid as required. The wall 54 of the blow-mould is provided with a plurality of vent passageways 102 which permit the air to be evacuated from the blow-moulding chamber 58. The vents 102 also permit steam to pass into the blow-moulding chamber 58. As previously indicated, the ouetr wall 62 of the pressure moulding chamber 64 is formed with vent passages 103 such that steam may pass through the wall 62 to enter the pressure forming chamber. Similarly, the inner wall 66 is formed with vent passages 105 such that air presssure may be applied to force a moulded element outwardly from the surface of the inner tube 66 towards the moulding surface 56 of the blow-mould 54.

When the apparatus is in use in the first stage of the operation, the outer tubular wall 62 is located in the position shown in FIG. 1 to co-operate with the inner tubular member 66 to define the pressure moulding or first moulding chamber 64. The passageway 86 is open and a predetermined quantity of polystyrene or other similar foamable plastic material is introduced into the pressure moulding chamber. When the mould has been filled with a predetermined quantity of foamable plastic, the passageway 68 is closed and dry steam is introduced at a predetermined pressure by way of the steam ports 100 into the mould housing 52 and by way of the bore 98 of the tube 88 into the interior of the tube 66. The steam passes through the vent passageways 102 in the mould 54 and the vent passageways 103 in the outer tube 62 to contact and activate the foamable plastic material within the pressure moulding chamber 64. The steam also passes through the passageways 105 formed in the inner wall 66 to contact and activate the foamable plastic. When the expansion of the foamable plastic has been completed, the moulding element has the form of a hollow tubular parison having one closed end. The supply of steam is then cut off and before the moulding element has had an opportunity to cool the hydraulic cylinder 42 is activated and the outer cylindrical wall 62 is withdrawn from the mould by the movement of the arm 34 to the position shown in broken lines in FIG. 1. After the outer wall 64 has been withdrawn, air is introduced into the interior of the moulding parison by way of the hollow bore 89 of the tube 88. The passageways 105 formed in the inner tubular member 66 permit the air to force the moulded article outwardly from the tube 66 towards the moulding surface 56 of the blow-mould to the position shown in FIG. 3. When the article has been formed to the contour of the blow-mould, the air pressure within the blow-mould is reduced and the vacuum is relieved. In order to speed the cooling of the moulded article, cooling fluid may be introduced into the mould by way of the steam passageways 98 or by other cooling coils positioned adjacent to the mould.

After the moulded article has been cooled, the mould is split along the abutting mould surfaces 51 by releasing the quick release clamping bolts and the lower half of the mould is removed. The arm 74 is then pivoted about the support bracket 81 and the moulded article is lowered from the upper half of the mould to the position shown in FIG. 4. The moulded article is then withdrawn over the outer wall forming tube 66.

In a typical moulding operation which was carried out on the apparatus of the present invention and which employed a steam pressure of 50 p.s.i. and an air pressure of 100 p.s.i., bottles were made from pre-expanded polyestyrene beads of a density of 3¾ lbs. per cubic foot. The predetermined quantity of beads were loaded into the mould by way of the passageway 68 and dry steam was introduced into both the outer chamber and the inner chamber through ports 98 and 88 respectively. After approximately 5 seconds the steam supply was cut off and after a further 7 seconds the outer tube 62 was withdrawn from the mould. Some 9 seconds later the steam in the outer chamber was released at a controlled speed. Thirty seconds later a short puff of air (approximately half a second) was introduced into the inner mould. The mould was allowed to cool for a further thirty-five seconds and it was then split and the moulded article removed.

Various other embodiments of the present invention will be apparent to those skilled in the art without departing from the scope of the present invention. For example, the two halves of the mould might readily be held together along the plane 51 by means of a hydraulic clamping device rather than the clamping bolts referred to above. Similarly, alternative means may be provided for causing the outer wall 60 to be withdrawn from the mould as required in use.

What I claim as my invention is:

1. Apparatus for moulding a plastic container comprising, first moulding means adapted to form a tubular parison, said first moulding means including restraining wall means for applying a restraining force to the outer surface of a parison, second moulding means having a second moulding surface surrounding said first moulding means and spaced outwardly therefrom to define a blow-moulding chamber therebetween, said restraining means being removable from said outer surface of said parison to remove the restraining force therefrom, passage means opening through said second moulding means into said blow-moulding chamber whereby heating fluid may enter said blow-moulding chamber to maintain a parison at an elevated temperature when said restraining means is removed, blow-moulding means for forming the preformed parison to the contour of said second moulding surface, said second moulding means being adapted to open to permit the removal of a moulded article, and passage means opening into said first moulding means for introducing a charge of plastic into said first moulding means.

2. Apparatus for moulding a plastic container comprising, first moulding means adapted to form tubular parison, said first moulding means including an outer tubular restraining wall against which an outer wall of a parison is formed, a plurlaity of passages formed in said outer wall at longitudinally spaced intervals along the length of said wall to permit a foaming agent to enter said first mould at spaced intervals along the length of the mould, second moulding means having a second moulding surface surrounding said first moulding means, said outer tubular restraining wall being movably mounted for withdrawal from said first moulding means to expose the outer surface of a parison to said second moulding surface, and blow-moulding means for forming the preformed parison to the contour of said second moulding surface, said second moulding means being adapted to open to permit the removal of a moulded article, and passage means opening into said first moulding means for introducing a charge of plastic material into said first moulding means.

3. Apparatus for moulding a plastic container comprising, first moulding means including an inner tubular wall and an outer tubular wall adapted to define a first moulding chamber, a plurality of passages formed in said outer wall at longitudinally spaced intervals along the length of said wall to permit a foaming agent to enter said first mould at spaced intervals along the length of the mould, second moulding means having a moulding surface surrounding siad first moulding means and spaced from said outer tubular wall to define a blow-moulding chamber therebetween, said outer tubular wall being movably mounted for withdrawal from said blow-moulding chamber to permit a tubular parison formed in said first moulding chamber to be expanded to the contour of said blow-mould, passage means opening through said second moulding means into said blow-moulding chamber whereby heating fluid may enter said blow-moulding chamber to maintain a parison at an elevated temperature when said restraining means is removed, blow-moulding means for forming the preformed parison to the contour of said second moulding surface, said second moulding means being adapted to open to permit the removal of a moulded article, and passage means opening into said first moulding chamber for introducing a charge of plastic material into said first moulding means.

4. The moulding apparatus claimed in claim 3 wherein an inner end of said outer tubular wall engages a portion of said second moulding surface and said first moulding meansi ncludes an inner tubular wall located within said outer tubular wall, said inner tubular wall having a closed end spaced from the portion of said second moulding surface enclosed by said outer tubular wall to provide a first moulding chamber adapted to form a hollow tubular parison having a closed end.

5. The moulding apparatus claimed in claim 3 including guide means for guiding said outer tubular wall upon withdrawal from said moulding means.

6. The molding apparatus claimed in claim 5 including means for mechanically moving said outer tubular wall into and out of said mould as required in use.

7. In an apparatus for forming containers from a foamable plastic, a mold comprising: a split mould housing formed symmetrically about a generally longitudinally extending axis and having an outer housing wall and an inner housing wall, the inner housing wall being spaced inwardly from a major portion of the outer housing wall to define an enclosure therebetween, passage means opening into said enclosure to admit heating or cooling fluid to said enclosure as required, said inner housing wall having an inner mould surface which is formed to the contour of the container to be produced, said inner and outer wall of said housing being formed with a main centrally located passage opening outwardly therethrough and located on said longitudinal axis, said inner housing being formed with a plurality of passages extending therethrough so as to communicate between said enclosure and the blow-moulding chamber which is formed within, the inner housing wall, first moulding means mounted in said main passage of said housing and extending into said blow-moulding cavity, said first moulding means including an inner tubular wall and an outer tubular wall, said inner tubular wall having an end closure wall spaced outwardly from the moulding surface of the inner housing wall, said outer tubular wall being spaced outwardly from said inner tubular wall and abutting the blow-moulding surface of said housing to form a first moulding chamber between the inner and outer tubular walls and the blow-moulding surface, said inner tubular and said outer tubular wall both being formed with a plurality of passages extending therethrough and longitudinally spaced along the length of said tubular walls to permit a foaming agent to enter said first mould at spaced intervals along the length of the first mould, said outer tubular wall being movably mounted for withdrawal from said blow-moulding chamber to permit a tubular parison formed in the first moulding chamber by a foaming process to be expanded to the contour of the blow-moulding surface of the inner wall of the housing, means for conveying air under pressure into the cavity formed within said inner tubular wall and passage means opening into the first moulding cavity formed between the inner and outer tubular walls for introducing a charge of plastic material into the first moulding means.

References Cited

UNITED STATES PATENTS

| | | | |
|---|---|---|---|
| 2,951,261 | 9/1960 | Sherman | 18—5 BH |
| 3,029,468 | 4/1962 | Valyi | 18—5 BI |

H. A. KILBY, Jr., Primary Examiner

U.S. Cl. X.R.

18—5 BO, 5 BB